(No Model.) 2 Sheets—Sheet 2.
H. GROSWITH.
ELECTRIC MOTOR.
No. 435,744. Patented Sept. 2, 1890.
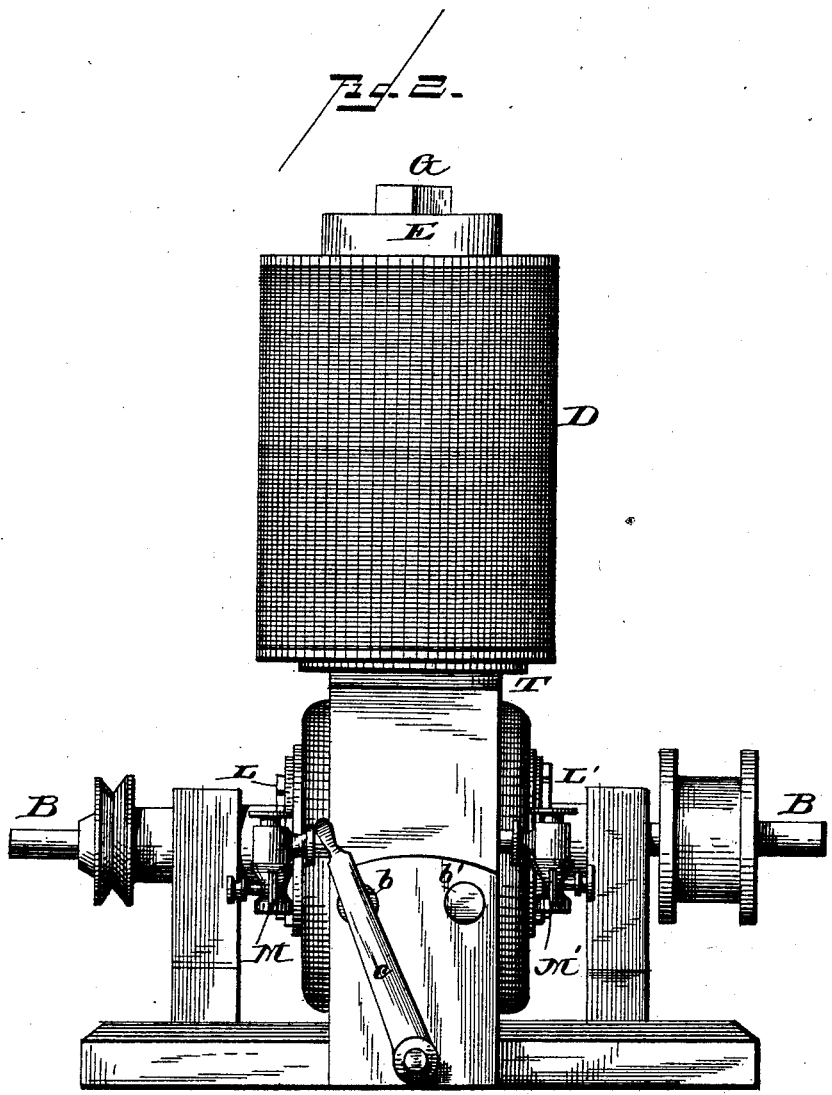
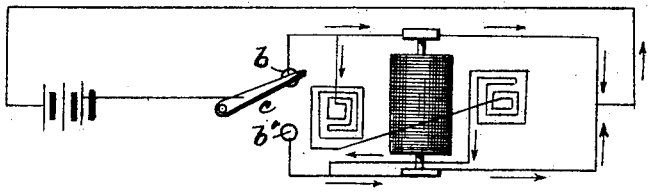
WITNESSES. INVENTOR:

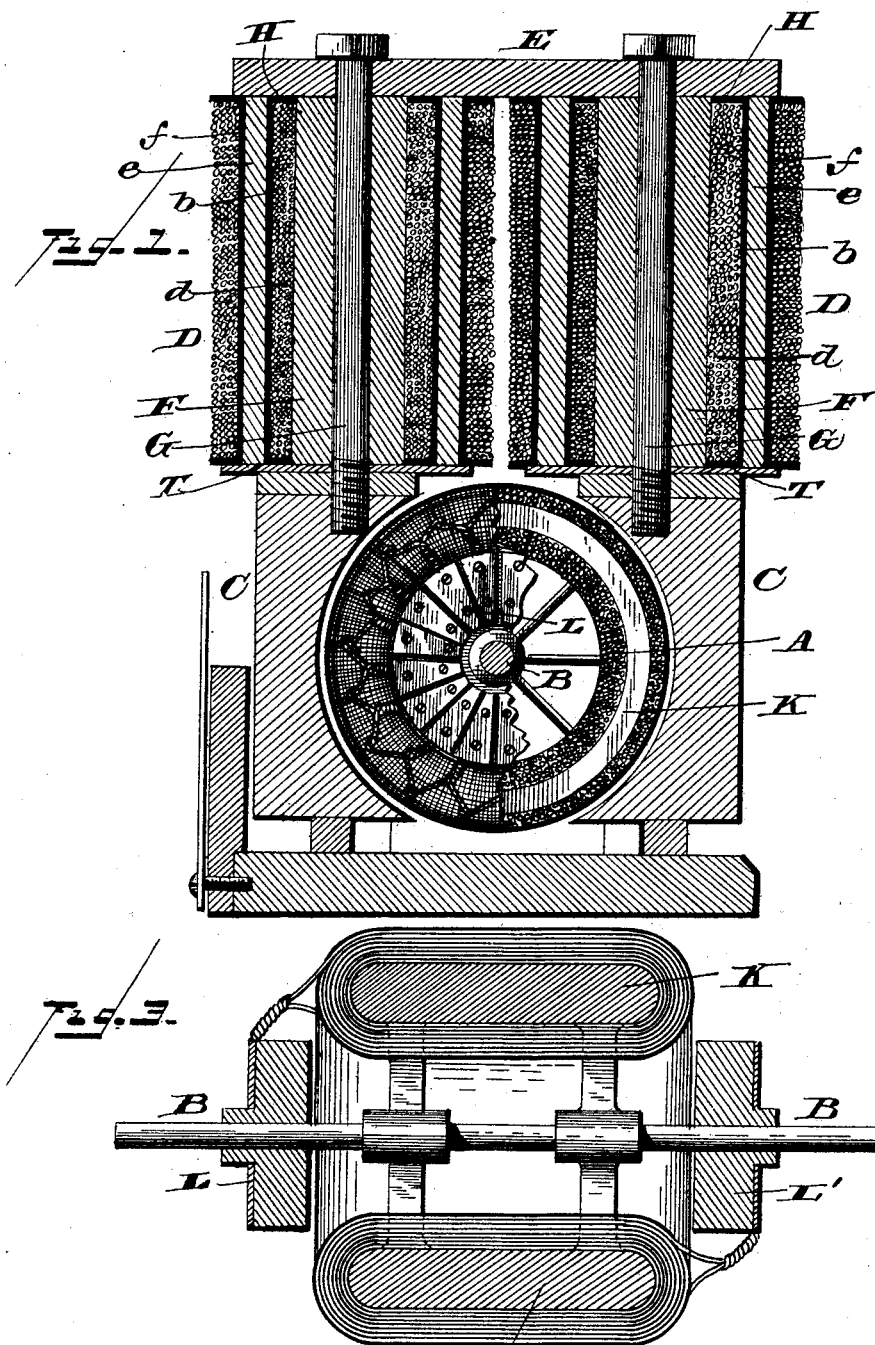

UNITED STATES PATENT OFFICE.

HENRY GROSWITH, OF PHILADELPHIA, PENNSYLVANIA, ASSIGNOR, BY DIRECT AND MESNE ASSIGNMENTS, OF THREE-FOURTHS TO CHARLES W. KENNEDY, OF SAME PLACE.

ELECTRIC MOTOR.

SPECIFICATION forming part of Letters Patent No. 435,744, dated September 2, 1890.

Application filed January 7, 1890. Serial No. 336,139. (No model.)

*To all whom it may concern:*

Be it known that I, HENRY GROSWITH, a citizen of the United States, and a resident of Philadelphia, in the county of Philadelphia and State of Pennsylvania, have invented certain new and useful Improvements in Electric Motors; and I do hereby declare that the following is a full, clear, and exact description of the invention, which will enable others skilled in the art to which it appertains to make and use the same.

My invention relates to improvements in electric motors, generators, &c.; and its object is to construct such a machine that may at the same time be highly efficient, sensitive, and economical, and quick to reverse or stop and start.

To this end it consists, essentially, in the construction of parts as hereinafter set forth, and illustrated in the accompanying drawings.

Figure 1 is a central vertical section of one form of machine, taken transverse to the shaft. Fig. 2 is a side elevation of the same. Fig. 3 is a longitudinal part section of my armature, and Fig. 4 is a diagram of circuits.

In the form illustrated, C are the pole-pieces. Upon these rest the compound-magnet elements D, and the whole is surmounted by the yoke-piece E. The several parts are secured by the bolts G, passing midway through the elements D into the poles C.

I form my field-magnet elements as follows: The core F, bored to receive bolts G, is first insulated in the usual way and then wound with the insulated wire $d$, forming my inner coil. This I surround, after insulating with a jacket $b$, of suitable material, with my second or ring core $e$, of proper magnetic material. After applying to this an insulating-jacket $f$ I again wind insulated conducting-wire $d$ to form my outer coil. Before placing the cores thus formed in position I further insulate the coils from the pole and yoke pieces by the insulating-rings T, and, if need be, also place an iron plate, as shown, between the magnet and pole piece C for the better magnetic conduction between $e$ and C.

The coils $d$ are so connected that the outer ones act together and are opposed to the two inner ones, yet it will be seen that all lines of force induced in the iron $e$, which lies between the two coils, are in the same direction, those due to the inner coil of necessity passing back through the inner core, while those due to the outer coil must return either by way of the armature or across the air-space. This is because lines of force must surround their inducing-coil. The polarity of the field may be determined by the inner coils if they be wound with many more turns than the outer; but, in view of the action stated, I prefer to have the effect of the outer coils predominate.

My armature is of a well-known type, being formed of two sets of separate coils alternately connected to a pair of separate commutators L L'. I have shown the Gramme ring K, mounted on the shaft B, though other forms would take its place with similar action.

The commutators are provided with the usual brushes, and connection is made as follows: The positive brushes of the respective commutators are connected with the two contacts $b\ b'$ of the switch $c$, which is connected with the positive-circuit terminal. The negative brushes are connected to the negative terminal. The two ends of the field-magnet wire are connected to the contacts $b\ b'$. It will now be seen from Fig. 4 that the current will excite the field-magnet in one or the other direction, according to whether the switch be on $b$ or $b'$, and the machine will run in one or the other direction if a motor. From this arrangement of parts I get great sensitiveness in the field system with but little sparking at the commutators, which latter effect is due largely to the subdivision of coils incident to double winding. From the combination of parts I get ready change of field with change of requirements, yet without undue heating of the field-magnets from fluctuations at each commutation. The latter is also prevented by the double armature winding.

Having now fully set forth one form of my invention, I do not limit myself to the details or forms of parts, but claim—

In an electric motor or generator, the combination of a field-magnet having inner and outer cores, respectively, wound with coils connected in opposite directions, an armature having two sets of windings, separate commutators, and brushes therefor, substantially as set forth.

In testimony that I claim the foregoing as my own I have hereunto affixed my signature in presence of two witnesses.

HENRY GROSWITH.

Witnesses:
BENNETT S. JONES,
WM. F. FOLKS.